United States Patent
Osborn et al.

(10) Patent No.: US 8,100,369 B2
(45) Date of Patent: Jan. 24, 2012

(54) I-BEAM SEISMIC SWAY BRACE CLAMP

(75) Inventors: Eric C. Osborn, Medina, OH (US); Nicholas J. Ambrogio, Highland Heights, OH (US); Eric J. Wilson, Solon, OH (US); Paul B. Allen, Medina, OH (US)

(73) Assignee: ERICO International Corporation, Solon, OH (US)

( * ) Notice: Subject to any disclaimer, the term of this patent is extended or adjusted under 35 U.S.C. 154(b) by 408 days.

(21) Appl. No.: 12/355,826

(22) Filed: Jan. 19, 2009

(65) Prior Publication Data

US 2009/0183462 A1    Jul. 23, 2009

Related U.S. Application Data

(60) Provisional application No. 61/022,406, filed on Jan. 21, 2008.

(51) Int. Cl.
*F16L 3/24* (2006.01)

(52) U.S. Cl. ............ 248/72; 248/70; 248/73; 248/74.4; 248/228.1; 248/313; 52/127.2; 52/703

(58) Field of Classification Search ............ 248/70, 248/72, 74.1, 49, 65, 67.7, 73, 74.4, 231.41, 248/228.1–228.3, 228.6, 313; 52/126.2, 52/126.7, 127.2, 127.5, 299, 489.1, 702, 52/703

See application file for complete search history.

(56) References Cited

U.S. PATENT DOCUMENTS

| | | | |
|---|---|---|---|
| 98,656 A | 1/1870 | Adt | |
| 714,461 A | 11/1902 | Dieter | |
| 714,761 A | 12/1902 | Tilley | |
| 1,245,047 A * | 10/1917 | Sherman | ........................ 248/72 |
| 1,282,489 A | 10/1918 | Strodel | |
| 1,559,084 A | 10/1925 | Gaillard | |

(Continued)

FOREIGN PATENT DOCUMENTS

CA    2279777 A1    10/2000

(Continued)

OTHER PUBLICATIONS

International Search Report and Written Opinion from corresponding International Application No. PCT/US09/31219.

*Primary Examiner* — William Gilbert

(74) *Attorney, Agent, or Firm* — Renner, Otto, Boisselle & Sklar, LLP

(57) ABSTRACT

An I-beam clamp, used for engaging the bottom flange of an I-beam or bar joist, includes a pair of threaded rods and a pair of brackets that can be moved relative to each other along the threaded rods. One of the brackets, a clamp bracket, has a set screw configured to engage a top surface of the I-beam flange, to hold the clamp in place once it is installed on the I-beam. The other of the brackets, a nut bracket, has half-threaded portions for selectively engaging the threaded rods, to hold the nut bracket in place relative to the threaded rods, and to disengage from the threaded rods, in order to allow positioning of the nut bracket along the threaded rods. The nut bracket may include a spring clip or other device to provide force to bias into engagement the threaded rods with the half-threaded portions.

17 Claims, 4 Drawing Sheets

U.S. PATENT DOCUMENTS

| | | | |
|---|---|---|---|
| 1,778,700 A * | 10/1930 | Whittier et al. | 248/72 |
| 2,045,307 A | 6/1936 | O'Connell | |
| 2,375,513 A | 5/1945 | Bach | |
| 2,665,951 A | 1/1954 | Bobst | |
| 2,699,190 A | 1/1955 | Packer | |
| 2,715,013 A | 8/1955 | Slick | |
| 2,722,858 A | 11/1955 | Oyen | |
| 2,951,672 A | 9/1960 | Bott | |
| 3,100,048 A | 8/1963 | Halverson | |
| 3,120,046 A | 2/1964 | Olsen | |
| 3,258,821 A | 7/1966 | Curran | |
| 3,269,766 A | 8/1966 | Gardner | |
| 3,342,909 A | 9/1967 | Fenton | |
| 3,572,623 A | 3/1971 | Lapp | |
| 3,575,405 A | 4/1971 | Harding | |
| D226,856 S | 5/1973 | Leto et al. | |
| 3,937,121 A | 2/1976 | Schubert | |
| 3,947,011 A | 3/1976 | Tsuyama | |
| 3,997,152 A | 12/1976 | Sass et al. | |
| 4,065,218 A | 12/1977 | Biggane | |
| 4,183,571 A | 1/1980 | Renfroe | |
| 4,228,983 A | 10/1980 | Bowman, Jr. | |
| D259,464 S | 6/1981 | Paley | |
| D262,237 S | 12/1981 | Stauber | |
| 4,342,477 A | 8/1982 | McClure | |
| 4,429,440 A | 2/1984 | Laughlin et al. | |
| 4,491,358 A | 1/1985 | Choung | |
| 4,524,942 A | 6/1985 | Kueny | |
| 4,570,885 A | 2/1986 | Heath | |
| 4,763,871 A | 8/1988 | Probst | |
| 4,826,113 A * | 5/1989 | Winters | 248/72 |
| 4,844,397 A | 7/1989 | Skakoon et al. | |
| 4,850,630 A | 7/1989 | Davies | |
| 4,998,691 A | 3/1991 | Brown | |
| 5,005,890 A | 4/1991 | Schwenger | |
| 5,188,317 A | 2/1993 | Roth | |
| 5,326,059 A | 7/1994 | Pryor et al. | |
| 5,349,979 A | 9/1994 | Zeien et al. | |
| 5,687,938 A | 11/1997 | Bailey | |
| 5,931,259 A | 8/1999 | Hoey | |
| 6,012,691 A | 1/2000 | van Leeuwen et al. | |
| 6,098,942 A | 8/2000 | Heath | |
| 6,119,992 A | 9/2000 | Stuart | |
| 6,227,757 B1 | 5/2001 | Delouvee et al. | |
| 6,273,372 B1 | 8/2001 | Heath | |
| 6,334,285 B1 | 1/2002 | Kirschner | |
| 6,517,030 B2 | 2/2003 | Heath | |
| 6,629,678 B1 | 10/2003 | Kirschner | |
| 6,702,132 B1 | 3/2004 | Moore et al. | |
| 6,708,930 B2 | 3/2004 | Heath | |
| 6,789,649 B2 | 9/2004 | Herrmann | |
| 6,898,905 B1 * | 5/2005 | Kirschner | 52/127.5 |
| 6,953,174 B2 | 10/2005 | Heath | |
| 7,097,141 B2 | 8/2006 | Heath | |
| 7,140,579 B2 | 11/2006 | Kirschner | |
| 7,191,987 B2 * | 3/2007 | Heath | 248/62 |
| 7,431,252 B2 | 10/2008 | Birli et al. | |
| 2005/0230582 A1 | 10/2005 | Birli et al. | |
| 2006/0024127 A1 | 2/2006 | Heath | |
| 2007/0170317 A1 | 7/2007 | Heath | |
| 2008/0277535 A1 | 11/2008 | Kirschner | |
| 2009/0183443 A1 | 7/2009 | Osborn et al. | |
| 2009/0183463 A1 | 7/2009 | Osborn et al. | |
| 2009/0184222 A1 | 7/2009 | Osborn et al. | |

FOREIGN PATENT DOCUMENTS

| | | |
|---|---|---|
| JP | 57131907 U | 8/1982 |
| JP | 57176504 U | 11/1982 |
| JP | 02012509 | 1/1990 |
| JP | 738863 U | 7/1995 |
| JP | 8128196 A | 5/1996 |
| JP | 08144508 | 6/1996 |
| JP | 9210021 A | 8/1997 |
| JP | 11035128 A | 2/1999 |
| JP | 11256813 | 9/1999 |
| KR | 2019980059451 U | 10/1998 |
| KR | 200396479 Y1 | 9/2005 |
| WO | 2009094302 A2 | 7/2009 |
| WO | 2009094303 A2 | 7/2009 |
| WO | 2009094313 A2 | 7/2009 |
| WO | 2009094320 A2 | 7/2009 |

* cited by examiner

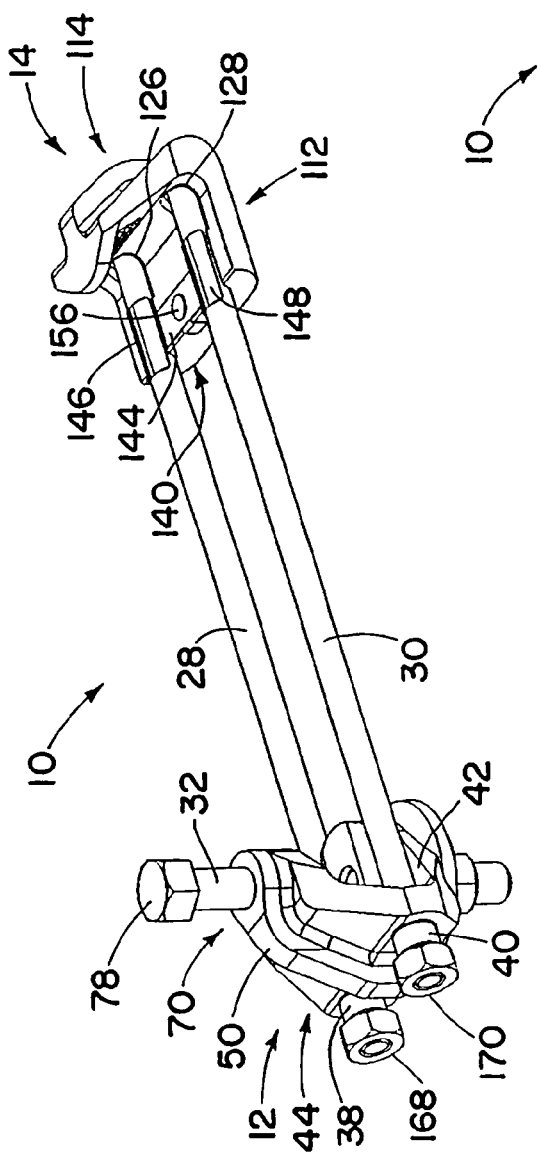
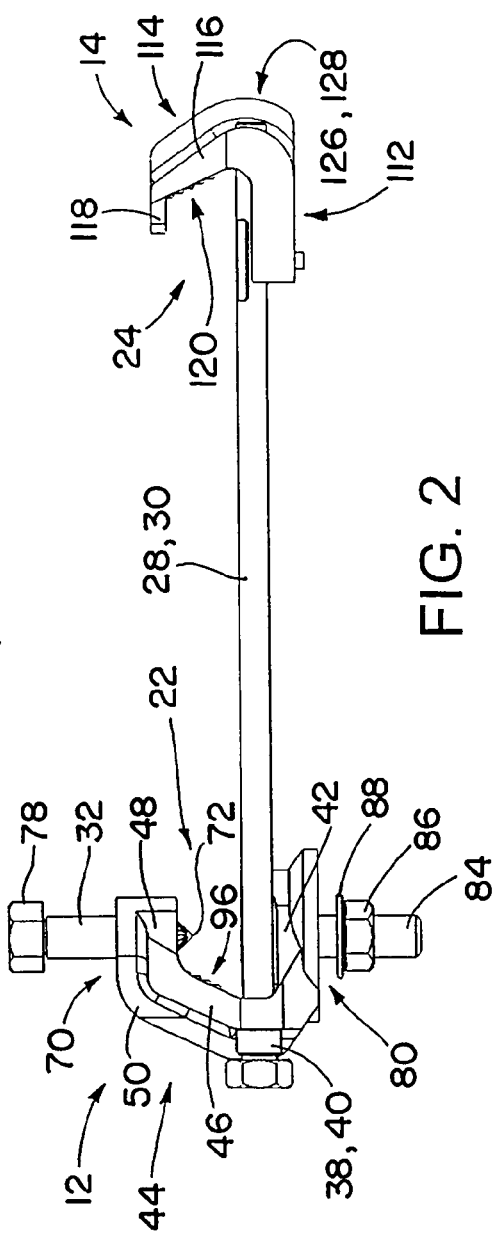
FIG. 1
FIG. 2

I-BEAM SEISMIC SWAY BRACE CLAMP

This application claims priority under 35 USC 119 from U.S. Provisional Application No. 61/022,406, filed Jan. 21, 2008, which is incorporated herein by reference in its entirety.

BACKGROUND OF THE INVENTION

1. Field of the Invention

The invention is in the field of attachments to I-beams, such as for use in seismic bracing, sway bracing, structure attachment fitting, and seismic restraint.

2. Description of the Related Art

Seismic sway bracing is often required for plumbing systems, fire sprinklers, electrical systems, heating conduits, ventilation conduits, air conditioning conduits, and other structural and non-structural components of a building as well as some equipment installed in buildings. One way of sway bracing is to couple a system to be braced to a pipe or other rigid structural member that is in turn coupled to building structure, such as a wall or a building structural member. The common practice in mounting to the lower flange of an I-beam requires the welding of a bracket to the bottom of the beam. This task is both time and labor intensive. Improvements would be desirable in bracing for pipes, conduits, and other objects.

SUMMARY OF THE INVENTION

An I-beam clamp includes a cast ductile iron bracket (a clamp bracket) with an acute angled opening, which the lower flange of an I-beam or similar structure fits into. Perpendicular to this opening is a tapped hole that accepts an engineered hardened cone tip screw. This screw bites into the top face of the lower flange of the I-beam when tightened. To insure proper biting force, the head of the screw is designed to snap off at a predetermined torque. In addition, a single tapped hole in the clamp bracket, coaxial to the engineered screw hole, is used for the mounting of seismic sway bracing or other objects. The coaxial position of the mounting hole helps to remove bending moments that would occur otherwise in the clamp bracket when loaded. Two clearance holes in the clamp bracket allow threaded rods to pass through to the rear bracket assembly. The rods are held in place with shear nuts designed with heads that snap off at a predetermined torque.

A rear bracket (nut bracket), also made of cast ductile iron, has the same acute angle opening that faces towards the clamp bracket's opening. The angles of both openings allow the brackets to grasp onto I-beams of varying flange thicknesses and shapes. The clamp bracket and nut bracket have a series of steps designed to provide contact points above flanges of different thicknesses. These steps prevent excessive rotation of the clamp and nut brackets as they are tightened against the flange. The nut bracket also has two half female threads with through holes located concentrically behind them. These female threads give the nut bracket the ability to engage and disengage the threaded rods. This ability allows the installer to quickly traverse the nut bracket inward along the axis of the rods without having to rotate the rods. The concentric through holes on the nut bracket help to contain the threaded rods when they are disengaged from the female thread. The diameter of the through hole relative to the minor female thread diameter is such that the rod will have enough vertical movement to completely disengage the female thread. These holes also remove the rotational degree of freedom, insuring that the nut bracket will always be positioned correctly relative to the clamp bracket. By itself, the nut bracket could be used to clamp on to an I-beam. This would occur when the rods are forced to engage the female threads by the bottom face of the I-Beam flange and the top of the flange is contacting the angled opening. This motion clamps the rods tightly against the female threads and insures that the rear bracket will now always act like a nut. Unfortunately, when the I-beam is not engaged, the nut bracket could slide off of the rods and be lost. To account for this, the nut bracket assembly also incorporates a spring mechanism that engages and disengages the threaded rod with the female thread. The spring is mounted to the nut bracket with a rivet, and has two wings that push down on top of the threaded rods. This mechanism enables the rear bracket to act as a nut when the threads are engaged without the contact of the I-beam and a through hole when disengaged.

According to an aspect of the invention, a clamp includes a bracket with half female thread, such as in a slot, to engage a threaded rod. The half thread female threaded slot has chamfers on its top surface to allow the threaded rod to have more guidance into place.

According to another aspect of the invention, a clamp includes a bracket, and a spring device used to engage and disengage the threaded rod with a half female thread of the bracket.

According to yet another aspect of the invention, a clamp includes a half female threaded hole that is used to engage and disengage a threaded rod.

According to still another aspect of the invention, a clamp includes matching acute angle brackets that draw up one another to the proper mounting position when the shear nuts are tightened.

According to a further aspect of the invention, a clamp, such as a clamp for engaging a lower flange of an I-beam, includes a series of steps on the faces of the acute angle brackets prevent excessive rotation of the brackets as they are tightened against flanges of different thicknesses.

According to a still further aspect of the invention, a clamp includes both threaded rods and a cone point screw to dig into the top surface of a bottom I-beam flange.

According to another aspect of the invention, a clamp includes the use of a breakaway screw head to insure proper screw loading is obtained.

According to yet another aspect of the invention, a clamp includes use of shear nuts, which insure proper threaded rod loading is obtained.

According to still another aspect of the invention, in a clamp the coaxial position of the mounting hole relative to the screw hole removes bending moments that would occur otherwise when the clamp bracket is loaded.

According to a further aspect of the invention, a clamp has a pair of brackets coupled to one or more threaded rods, wherein the clamp has a fully integrated configuration, with no loose parts, even prior to beginning installation of the clamp.

According to a still further aspect of the invention, a clamp has an undercut radius on the inside opening of a clamp bracket, which creates a virtual sharp corner to insure two point contact between the clamp bracket and the I-beam.

According to another aspect of the invention, a clamp applies pressure to both sides of a beam flange while the hardware use to secure the assembly is only on one side: this enables the installer to tighten hardware with tools on only one side of the beam.

According to yet another aspect of the invention, a clamp includes wings on a clamp bracket, located underneath (in contact with) threaded rods, to help control the freedom of movement of the rods. This limits the magnitude of the bracket not mounting flush to the bottom of an I-beam.

According to still another aspect of the invention, a clamp includes a spring clip with a tab located on the front of the spring clip that prevents the spring clip from rotating in place when assembled with a rivet.

According to a further aspect of the invention, a clamp for engaging an I-beam or bar joist, the clamp including: a clamp bracket; a nut bracket; and a pair of threaded rods coupling to both the clamp bracket and the nut bracket. The threaded rods pass through respective clearance holes in the clamp bracket. The nut bracket has a pair of half-threaded portions that are used selectively either to engage the threaded rods, to lock the nut bracket in place relative to the threaded rod, or to disengage from the threaded rods, to all the nut bracket to slide relative to the threaded rods. The clamp bracket and the nut bracket have respective angled openings configured to receive end portions of a bottom flange of an I-beam that the clamp is to engage.

According to a still further aspect of the invention, a method of attaching a clamp to building structure includes the steps of: pressing a pair of brackets of the clamp against opposite sides of a flange of the building structure; and securing the clamp by tightening hardware on one side of the clamp.

Unless it is indicated otherwise, it is to be understood that the above aspects of the invention and the features of the embodiment(s) of the invention described below, may be combinable in a single device, in various combinations.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Annexed are drawings depicting one or more embodiments of the invention. The drawings are not necessarily to scale.

FIG. 1 is an oblique view of a clamp, according to an embodiment of the present invention.

FIG. 2 is a side view of the clamp of FIG. 1.

DETAILED DESCRIPTION

Figure 3:
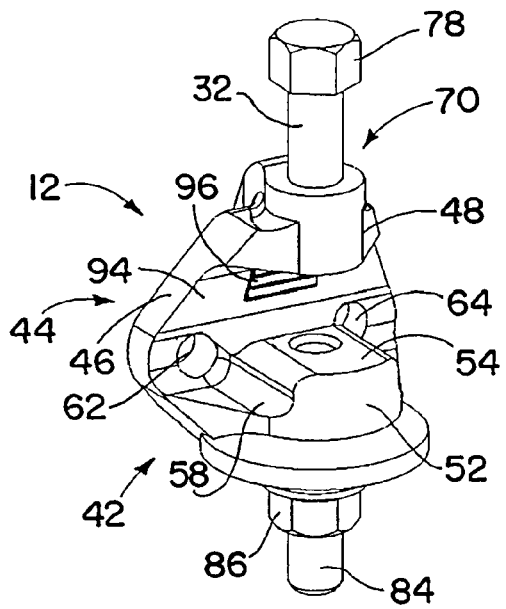
FIG. 3 is an oblique view of a clamp bracket of the clamp of FIG. 1.

An I-beam clamp, used for engaging the flange of an I-beam, bar joist, or other structural member includes a pair of threaded rods and a pair of brackets that can be moved relative to each other along the threaded rods. The brackets have respective angled openings for engaging opposite ends of the I-beam. The brackets also have steps on inner surfaces facing the angled openings, for engaging I-beam flanges having different thicknesses. One of the brackets, a clamp bracket, has a set screw configured to engage a top surface of the I-beam flange, to hold the clamp in place once it is installed on the I-beam. The clamp bracket also has a mounting hole for mounting or suspending objects, such as sway braces, from the I-beam clamp. The hole for the set screw and the mounting hole may be substantially coaxial. The other of the brackets, a nut bracket, has half-threaded portions for selectively engaging the threaded rods, to hold the nut bracket in place relative to the threaded rods, and to disengage from the threaded rods, in order to allow positioning of the nut bracket along the threaded rods. The nut bracket may include a spring clip or other device to provide force to bias into engagement the threaded rods with the half-threaded portions. Shear nuts on the threaded rods may be used to tighten the brackets against opposite ends of the I-beam flange. Heads of the shear nuts may be configured to shear off when a predetermined torque is reached, to prevent overtightening of the nuts.

Referring initially to FIGS. 1 and 2, a clamp 10 is configured for engaging the bottom flange of an I-beam, bar joist or other structural member. The clamp 10 may be used for hanging sway braces or other objects from an I-beam or bar joist, such as as part of a sway brace system for providing bracing for pipes or other objects.

The clamp 10 includes a pair of brackets, a clamp bracket 12 and a nut bracket 14, that are used to engage opposite ends of the bottom flange of the I-beam. The I-beam flange fits into and is secured within angled openings 22 and 24 of the brackets 12 and 14. The clamp 10 also includes a pair of threaded rods 28 and 30 that couple together the brackets 12 and 14, and that run underneath a flange when the clamp 10 is installed on an I-beam or bar joist. The clamp 10 is secured in place by a set screw 32 and a pair of shear nuts 38 and 40.

Figure 4:
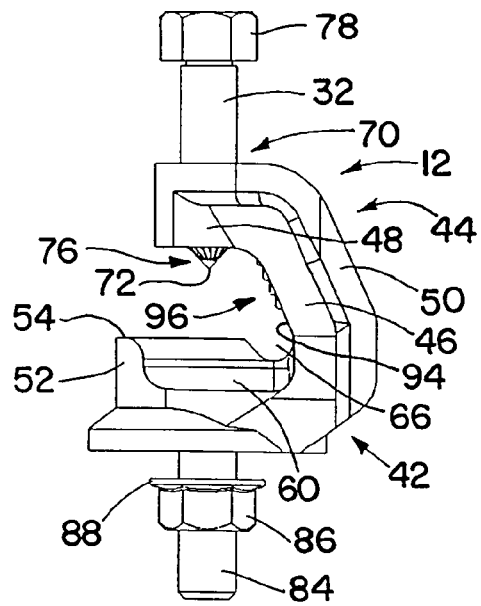
FIG. 4 is a side view of the clamp bracket of FIG. 3.

With reference now in addition to FIGS. 3 and 4, the clamp bracket 12 has a base 42, and a flange 44 extending upward from the base 42. The flange 44 includes a proximal flange part 46 that extends diagonally from the base 42, and a distal flange part 48 that extends at an angle from the proximal flange part 46, and that runs substantially parallel to the base 42. A center rib 50 provides structural reinforcement to the flange 44.

The base 42 has a central portion 52 with a flat upper surface 54 upon which the I-beam flange rests when the clamp 10 is installed. On opposite sides of the central portion 52 are channels 58 and 60, which receive and support the threaded rods 28 and 30. The channels 58 and 60 are open-topped channels that are aligned with holes 62 and 64 at the base of the flange 44. The channels 58 and 60 and the holes 62 and 64 are smooth (non-threaded). They allow the threaded rods 28 and 30 to pass freely through, with ends of the threaded rods 28 and 30 prevented from passing through the holes by the shear nuts 38 and 40 threaded on the rods 28 and 30.

An undercut 66 is provided between the base central portion 52 and the flange 44. The undercut 66 is below the level of the base upper surface 54. The undercut radius 66 on the inside opening of the clamp bracket 12 creates a virtual sharp corner to insure two point contact between the clamp bracket 12 and the I-beam, engaging the upper surface 54 and steps on steps on an inner surface of the proximal flange part 46.

The clamp bracket 12 has a threaded hole 70 in the distal flange part 48. The threaded hole 70 receives the set screw 32. The set screw 32, when tightened, has its tip 72 move into the angled opening 22 defined by the flange 44 and the base 42, between the distal flange part 48 and the base upper surface 54. Tightening the screw 32 presses the tip 72 against the I-beam flange, which serves to hold the clamp 10 in place on the I-beam. This may involve the tip 72 digging into the material of the I-beam flange and/or may involve displacement of flange material.

The set screw 32 may be a hardened cone tip screw, and may have spiral knurls 76 around its tip 72. The set screw 32 may have snap-off head 78, for example a hex head, that shears off or snaps off at a predetermined torque. This prevents overtightening of the set screw 32. It will be appreciated that other sorts of threaded fasteners may be used in place of the set screw 32.

A mounting hole 80 is located on the underside of the base 42. The mounting hole 80 is used to receive a threaded mounting rod 84 for mounting a sway brace or other object to the clamp 10. The sway brace may be used to brace a pipe or other object, with another clamp used to couple together the sway brace and the pipe or other object. A nut 86 and a washer 88 may be installed around the mounting rod 84 for coupling objects. The mounting hole 80 may be substantially coaxial with the threaded hole 70 for the set screw 32. The coaxial position of the mounting hole 80 and the threaded hole 70 helps to remove bending moments that would occur otherwise in the clamp bracket 12 when loaded.

An inner surface 94 of the proximal flange part 46 includes a series of steps 96. The steps 96 are on an angled part of the clamp bracket 12. The steps 96 provide a number of surfaces substantially perpendicular to the surface 54, and provide locations for the corners of the I-beam flange to be secured. The steps 96 provide contact points above flanges of different thicknesses. These steps 96 prevent excessive rotation of the clamp bracket 12 as the brackets 12 and 14 are tightened against the I-beam flange.

Figure 5:
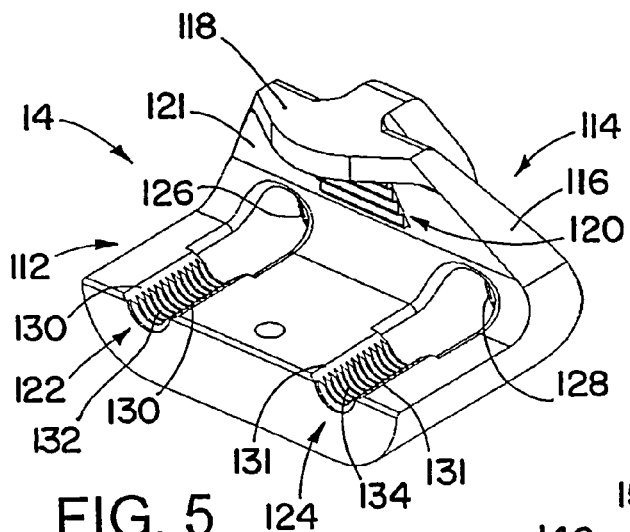
FIG. 5 is an oblique view of a nut bracket of the clamp of FIG. 1.

With reference now to FIG. 5, the nut bracket 14 includes many features that are similar to those of the clamp bracket 12. The nut bracket has a base 112, with a flange 114 extending from the base 112. The flange 114 has a pair of parts, an angled or diagonal proximal flange part 116 emerging from the base 112 at an acute angle (which may be the same as the angle between the base 42 and proximal flange part 46), and a distal flange part 118 that may be substantially parallel to the base 112. The base 112 and the flange parts 116 and 118 together define the angled opening 22 that receives the I-beam flange. A set of steps 120 on an inner surface 121 of the proximal flange part 116 may assist in holding the nut bracket 14 in place on an I-beam flange edge.

The base 112 has a pair of channels 122 and 124 for receiving threaded rods 26 and 28. The channels 122 and 124 are aligned with a pair of through holes 126 and 128 at the junction between the base 112 and the flange 114. The channels 122 and 124 are open slots in the base 112, and surround roughly half of the perimeter of the threaded rods 26 and 28. The channels 122 and 124 have respective pairs of chamfers 130 and 131 on their corners. The chamfers 130 and 131 are sloped surfaces that urge the threaded rods 26 and 28 into the channels 122 and 124.

Portions 132 and 134 of the channels 122 and 124 are threaded, so as to engage the threads on the threaded rods 26 and 28. The portions 132 and 134 are thus half-threaded portions of the nut bracket 14. The portions 132 and 134 may be used to engage the threads of the rods 26 and 28, to prevent relative large-scale movement (such as by sliding) between the nut bracket 14 and the threaded rods 26 and 28. With the threads of the rods 26 and 28 engaged in the half-threaded portions 132 and 134, relative movement between the nut bracket 14 and the threaded rods 26 and 28 may only be accomplished by turning the threaded rods 26 and 28, screwing the rods 26 and 28 along the threaded portions 132 and 134. When sliding of the nut bracket 14 relative to the threaded rods 26 and 28 is desired, it may be accomplished by moving the nut bracket 14 downward relative to the rods 26 and 28. This disengages the threads of the rods 26 and 28 from the threads of the portions 132 and 134. Once a desired relative position is achieved, the threaded portions 132 and 134 and the rods 26 and 28 may be brought back into engagement, preventing gross relative movements (such as by sliding) between the nut bracket 14 and the rods 26 and 28.

Figure 6:
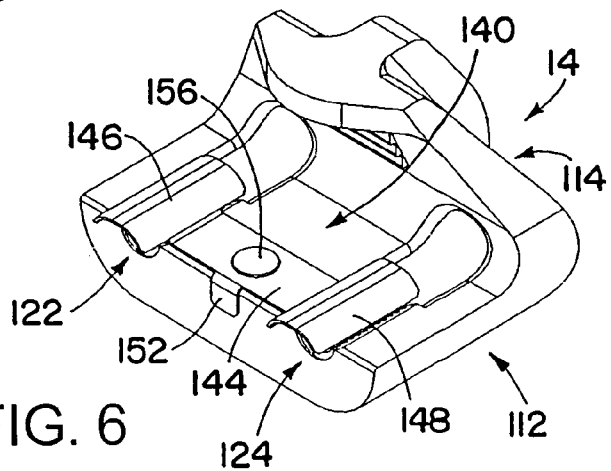
FIG. 6 is an oblique view of the nut bracket of FIG. 5, with a spring clip attached.

A resilient device, a spring clip 140, is attached to a top surface 142 of the nut bracket base 112, as is shown in FIG. 6. The spring clip 140 is used to provide a downward force against the threaded rods 26 and 28. This may be used to bias the threaded rods 26 and 28 into threaded engagement with the threaded portions 132 and 134.

The spring clip 140 may be a monolithic, unitary sheet metal clip having a central body 144, a pair of wings 146 and 148, and a tab 152. The wings 146 and 148, and the tab 152, may be formed by suitable processes, such as bending, from an initially flat piece of sheet metal. The central body 144 in the illustrated embodiment is attached to the top surface 142 by a rivet 156, although it will be appreciated that another suitable fastener or attachment mechanism may be utilized.

The wings 146 and 148 may have rounded shapes, such as a semi-circular shape, that engages top surfaces of the threaded rods 26 and 28. The wings 146 and 148 press against the rod top surfaces, over the threaded portions 132 and 134 of the channels 122 and 124. This biases the engagement of the threads of the rods 26 and 28 with the half-threaded portions 132 and 134, which prevents sliding of the nut bracket 14 along the rods 26 and 28 without application of a disengaging force to disengage the rods 26 and 28 from the half-threaded portions 132 and 134.

The tab 152 is used to prevent rotation of the spring clip 140 about the axis of the rivet 156. The tab 152 is substantially perpendicular to the clip body 144, and engages a front surface 160 of the nut bracket base 112.

It will be appreciated that optionally the nut bracket 14 may have a mounting hole similar to the mounting hole 80 of the clamp bracket 12.

The clamp bracket 12 and the nut bracket 14 may be made of cast ductile iron or another suitable material. It will be appreciated that alternative materials and processes may be used.

Referring back to FIGS. 1 and 2, the shear nuts 38 and 40 have shear heads 168 and 170 that shear off when a predetermined torque is reached. The shear heads on the set screw 32 and on the shear nuts 38 and 40 helps to insure the proper torque application during installation of the clamp 10.

As noted above, the clamp 10 may be part of a sway bracing system, for example to anchor sway braces for seismic bracing. It will be appreciated that the clamp 10 may also be used for non-seismic hanging from I-beams and bar joists. The clamp 10 may be used to mount various sway bracing members in addition to non-seismic bracing.

FIGS. 7-11 shows steps in the process of installation of the clamp 10 on a flange 200 of an I-beam 202. It will be appreciated that a similar process may be used to install the clamp on a flange of another type of structural member. The clamp 10, even from the beginning of the installation process, can be manipulated as a single piece. All of the parts are coupled together prior to the installation process—the brackets 12 and 14 are installed on the threaded rods 26 and 28, with the shear nuts 38 and 40 preventing disengagement of the clamp bracket 12, and with the spring clip 140 preventing disengagement of the nut bracket 14.

Figure 7:
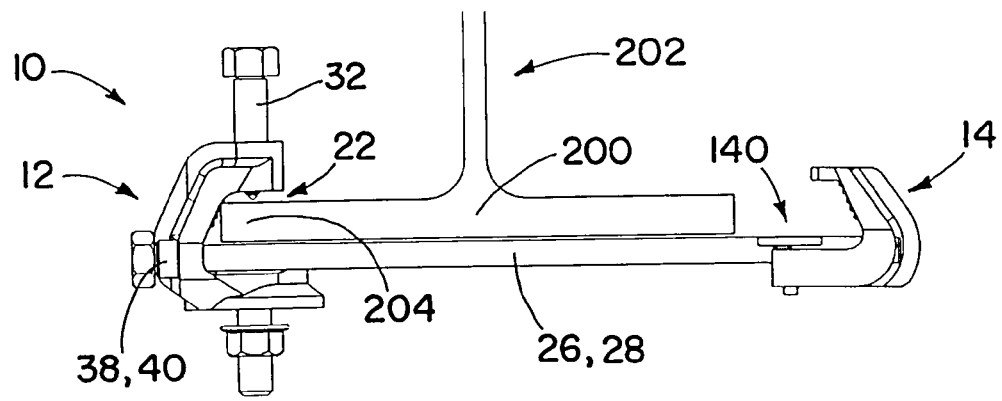
FIG. 7 is a side view showing a first step in the installation of the clamp of FIG. 1 on a bottom flange of an I-beam.

FIG. 7 shows the clamp 10 being engaged with one end 204 of the flange 200. The clamp bracket 12 is pressed onto the flange end 204, with the flange end 204 in the angled opening 22.

Figure 8:
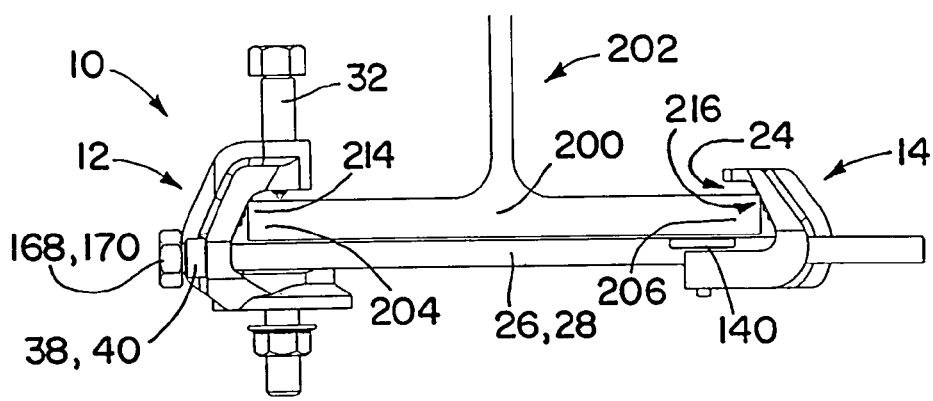
FIG. 8 is a side view showing a second step in the installation of the clamp of FIG. 1 on the bottom flange.

FIG. 8 shows the clamp 10 engaged with the opposite end 206 of the flange 200. The nut bracket 14 is disengaged from the threaded rods 26 and 28 by moving the nut bracket 14 downward against the resilient force of the spring clip 140. Then the nut bracket 14 is slid along the threaded rods 26 and 28, into engagement with the end 206 of the flange 200. This lodges the end 206 within the angled opening 24 of the nut bracket 14. A corner 214 of the end 204 may engage one of the steps 96 (FIG. 3) of the clamp bracket 12, and a corner 216 of the end 206 may engage one of the steps 120 (FIG. 5) of the nut bracket 14. Once the brackets 12 and 14 are in place, the nut bracket 14 may be released to allow the threaded rods 26 and 28 to engage the half-threaded portions 132 and 134 (FIG. 5) of the nut bracket 14, preventing disengagement of the brackets 12 and 14 from the flange ends 204 and 206.

Figure 9:
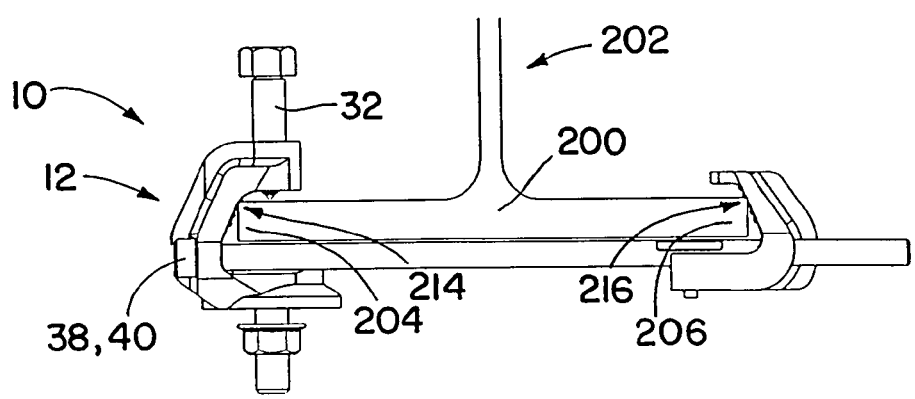
FIG. 9 is a side view showing a third step in the installation of the clamp of FIG. 1 on the bottom flange.

FIG. 9 illustrates the tightening of the shear nuts 38 and 40. The tightening of the shear nuts 38 and 40 brings the brackets 12 and 14 into tighter engagement with the flange ends 204 and 206. If the corners 214 and 216 were not already engaged with the steps 96 and 120, the tightening of the shear nuts 38 and 40 brings the corners 214 and 216 into such engagement. The shear nuts 38 and 40 are tightened until their heads 168 and 170 (FIG. 8) shear off. This ensures proper tightening of the shear nuts 38 and 40.

Figure 10:
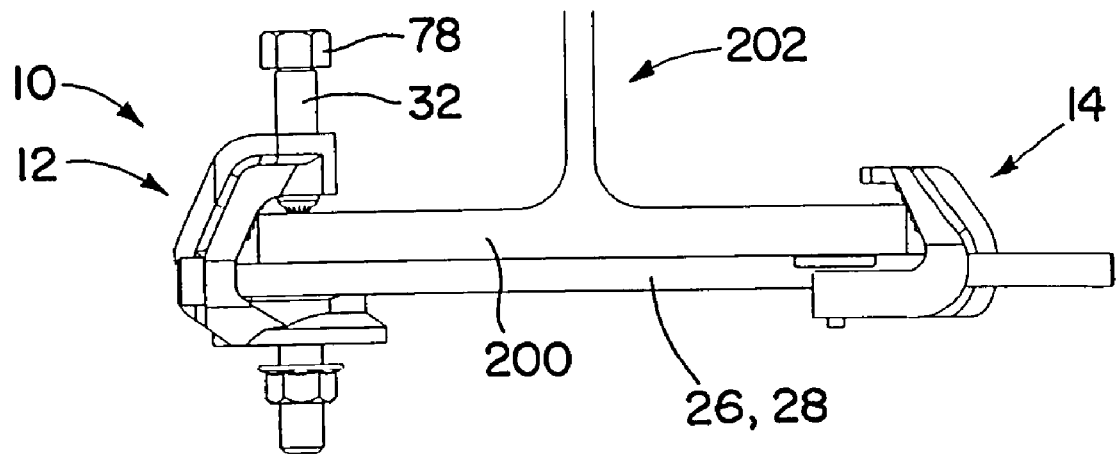
FIG. 10 is a side view showing a fourth step in the installation of the clamp of FIG. 1 on the bottom flange.
Figure 11:
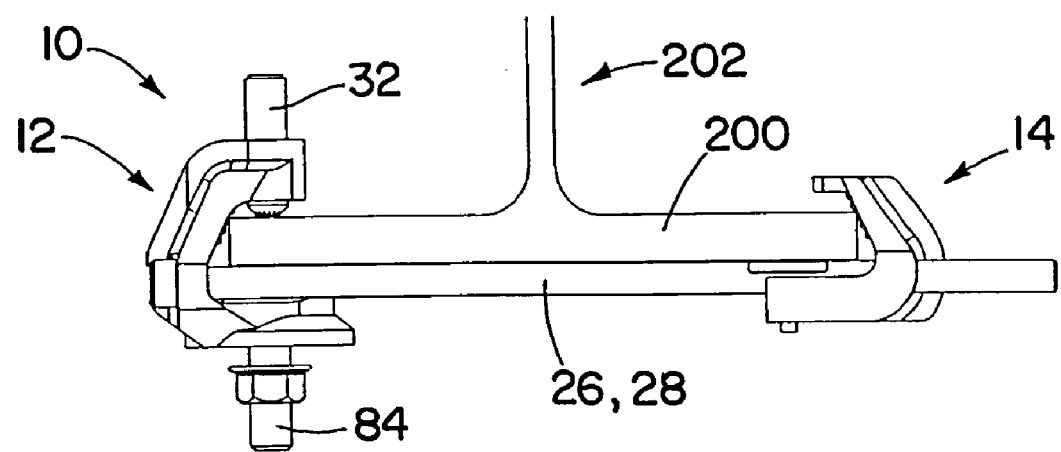
FIG. 11 is a side view showing a fifth step in the installation of the clamp of FIG. 1 on the bottom flange.

In FIG. 10 the screw 32 is tightened to drive its tip into the material of flange 200. This is done until the snap-off shear head 78 of the screw 32 snaps off, as is shown in FIG. 11. The tightening of the set screw 32 helps secure the clamp 10 onto the flange 200, and helps support a load on the mounting rod 84.

One advantage of the installation of the clamp 10 is that the clamp applies pressure to both sides of a beam flange while the hardware use to secure the assembly is only on one side. This enables the installer to tighten hardware with tools on only one side of the beam.

Another advantage is that the clamp 10 has all its parts mechanically coupled together, even before the beginning of the installation process. This reduces the possibility of dropped parts, and avoids the need to couple together separate parts during the installation process, which can be difficult when an installer is on a ladder, for example.

The application of the I-beam clamp to the seismic assembly will make the installation of seismic sway bracing to I-beams one of the fastest to install in the industry and will avoid the loss of bolts and nuts while elevated in the air. This is an advantage to today's installation methods in the market.

Although the invention(s) has (have) been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A clamp for engaging a structural member, the clamp comprising:
    a clamp bracket;
    a nut bracket; and
    a pair of threaded rods coupling to both the clamp bracket and the nut bracket;
    wherein the threaded rods pass through respective clearance holes in the clamp bracket;
    wherein the nut bracket has a pair of half-threaded portions that are used selectively either to engage the threaded rods, to lock the nut bracket in place relative to the threaded rod, or to disengage from the threaded rods, to allow the nut bracket to slide relative to the threaded rods; and
    wherein the clamp bracket and the nut bracket have respective angled openings configured to receive end portions of a bottom flange of a structural member that the clamp is to engage.

2. The clamp of claim 1, further comprising shear nuts on the threaded rods that are tightened against one of the brackets until heads of the shear nuts shear off, in order to secure the clamp in place.

3. The clamp of claim 1, further comprising a resilient device coupled to the nut bracket, to bias the threaded rods into engagement with threads of the half-threaded portions.

4. The clamp of claim 3, wherein the resilient device includes a spring clip that is attached to the nut bracket.

5. The clamp of claim 4, wherein the spring clip is riveted to the nut bracket.

6. The clamp of claim 4, wherein the spring clip is a sheet metal clip that has a pair of wings that press against the threaded rods and that are diametrically opposed to parts of the half-threaded portions.

7. The clamp of claim 6,
    wherein the wings are coupled to a body of the sheet metal clip;
    wherein the body is in contact with a first surface of the nut bracket; and
    wherein the sheet metal clip also has a tab that is coupled to the body, with the tab in contact with a second surface of the sheet metal bracket that is at an angle to the first surface.

8. The clamp of claim 1, wherein one of the brackets includes a threaded hole that receives a screw that has a tip that enters the angled opening of the one of the brackets when the screw is tightened, in order to engage a top surface of the flange and hold the clamp in place.

9. The clamp of claim 8, wherein the one of the brackets is the clamp bracket.

10. The clamp of claim 8, wherein the threaded hole has an axis that is substantially perpendicular to a plane defined by the threaded rods.

11. The clamp of claim 8,
    wherein the screw has a breakaway screw head that shears off at a predetermined torque; and
    wherein the tip is a cone point tip.

12. The clamp of claim 8, wherein the one of the brackets also has a mounting hole for receiving a screw or an object to be mounted to the one of the brackets.

13. The clamp of claim 12, wherein the axes of the threaded hole and of the mounted hole are substantially collinear.

14. The clamp of claim 1, wherein the brackets have respective sets of steps on respective inner surfaces facing the angled openings, for inhibiting rotation of the brackets as the brackets engage flanges of various thicknesses.

15. The clamp of claim 1, wherein the brackets are cast iron brackets.

16. The clamp of claim 1,
wherein the brackets apply pressure to opposite sides of the flange; and
further comprising hardware on only one side of the clamp to secure the clamp to the flange.

17. The clamp of claim 16, wherein the hardware includes:
a pair of nuts coupled to the threaded rods; and
a set screw engaging a threaded hole in one of the brackets.

\* \* \* \* \*